May 19, 1925.
J. J. B. DREESEN
1,538,276
BOLL WEEVIL EXTERMINATOR
Original Filed Oct. 29, 1923   3 Sheets-Sheet 3
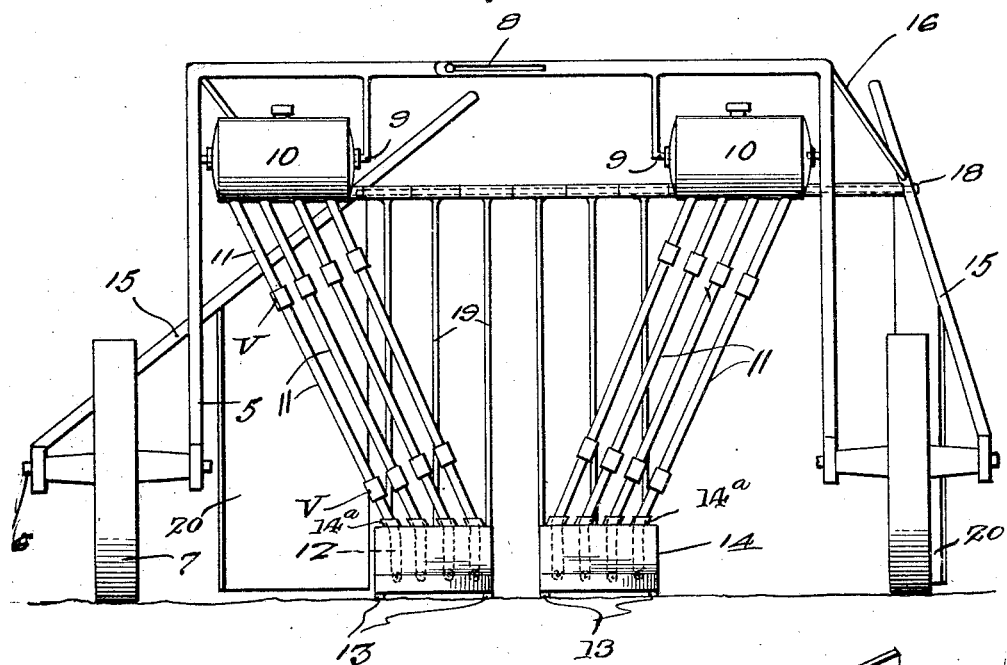
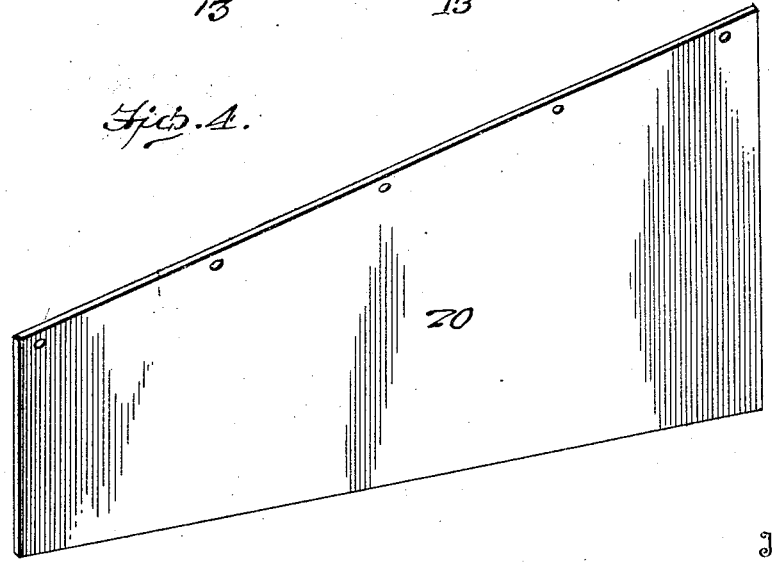

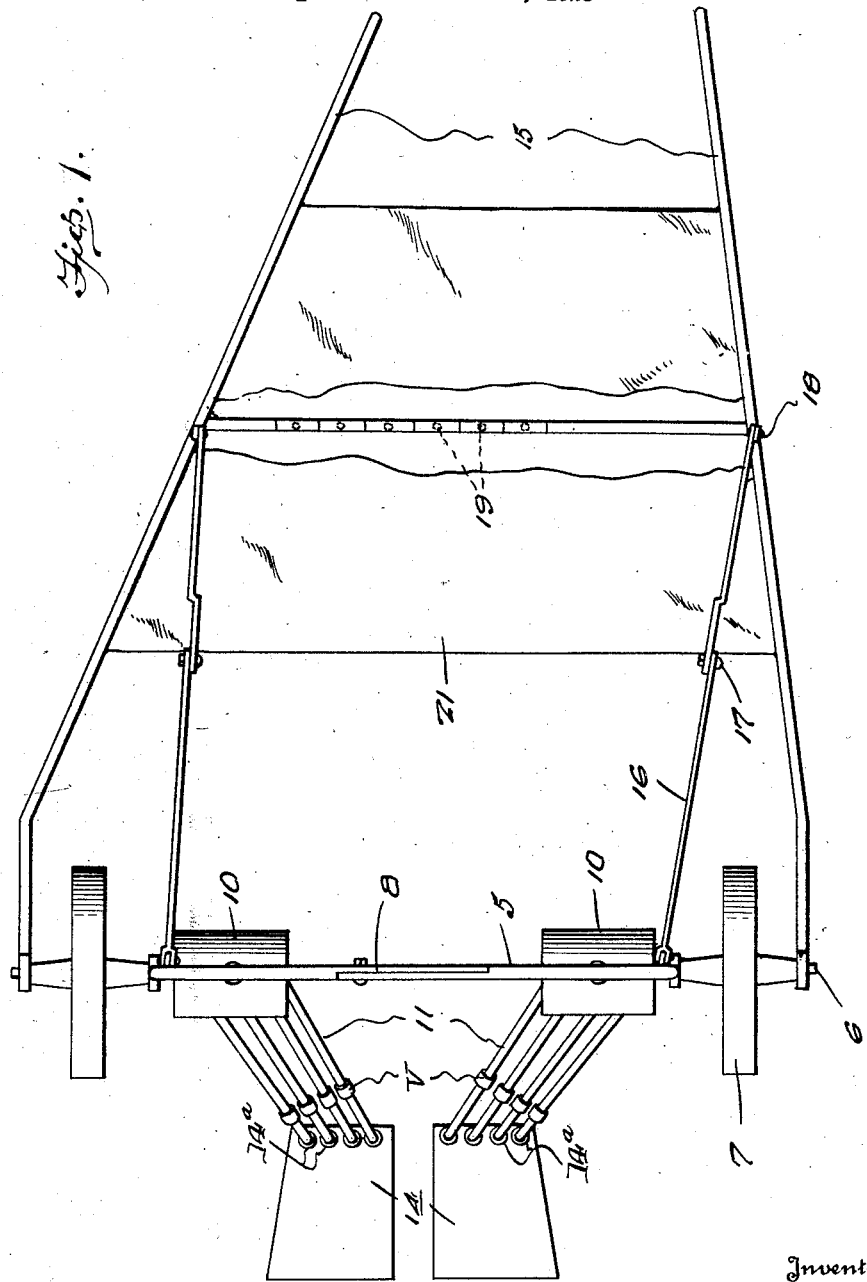

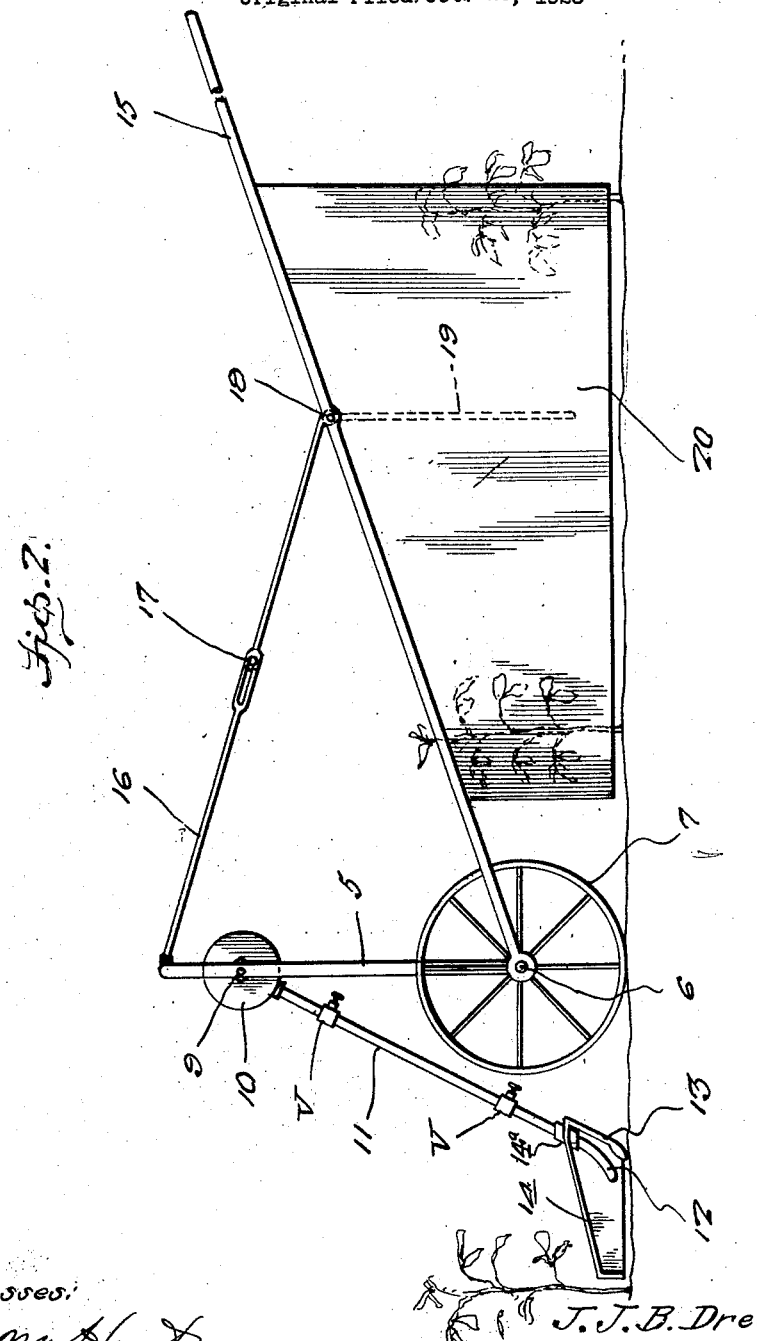

Patented May 19, 1925.

1,538,276

UNITED STATES PATENT OFFICE.

JEROME J. B. DREESEN, OF JEFFERSON, TEXAS.

BOLL-WEEVIL EXTERMINATOR.

Application filed October 29, 1923, Serial No. 671,429. Renewed April 4, 1925.

*To all whom it may concern:*

Be it known that I, JEROME J. B. DREESEN, citizen of the United States, residing at Jefferson, in the county of Marion and State of Texas, have invented certain new and useful Improvements in Boll-Weevil Exterminators, of which the following is a specification.

This invention relates to certain new and useful improvements in boll weevil exterminators, and has particular reference to an improved portable implement by the use of which the boll weevil may be effectively removed from rows of plants and destroyed subsequently by fire.

The primary object of the invention is to provide a device of the above kind which shall be simple and durable in construction, as well as efficient in operation.

Another object is to provide an implement adapted to be drawn parallel with rows of plants and having simple and effective means for knocking the insects therefrom, means being provided rearwardly of the knocking means for effectively destroying the insects immediately following their removal from the plants.

Still another object of the invention is to provide means of a novel and practical construction for destroying the insects by fire and wherein burners are embodied capable of yielding outwardly over irregularities in the ground for preventing damage to the device.

Other objects will appear as the nature of the invention is better understood, and the same consists in the novel form, combination, and arrangement of parts hereinafter more fully described, shown in the accompanying drawings, and claimed.

In the drawings, wherein like reference characters indicate corresponding parts throughout the several views:

Figure 1 is a top plan view, partly broken away of a boll weevil exterminator constructed in accordance with the present invention.

Figure 2 is a side elevational view of the device shown in Figure 1.

Figure 3 is a rear elevational view thereof, and

Figure 4 is a perspective view of one of the side members of the knocker shield or hood.

Referring more in detail to the drawings, the present invention comprises an inverted substantially U-shaped frame 5 that is provided with rigid outturned end members forming axles 6 upon which the co-axial ground engaging or supporting wheels 7 are journalled, said U-frame being adjustable in width for changing the width of wheel track preferably by forming the same in half sections with adjustably connected overlapped ends as indicated at 8.

Rigid with the frame and located in each upper corner thereof is a transverse shaft 9 upon which is rotatably mounted a fuel supply tank 10, each of which has a plurality of parallel descending and rearwardly extending fuel supply pipes 11 rigid with the bottom thereof, the fuel supply pipes of the two tanks converging downwardly toward each other as shown in Figure 3 and having sets of burners 12 upon the lower ends thereof arranged in sufficiently spaced relation to permit the passage of the plants between said sets of burners. The tanks are equipped with as many sets of fuel pipes as are found most desirable and through these pipes the fuel is fed from the tank by gravity or under pressure as is found most desirable, to the burner, from which large flames are swept on the ground covered thereby. To protect the plants from being burned by the issuing flame, a protecting hood 14 is placed over each set of burners. If desired, the hoods may be opened on their front sides and the end walls may be provided with rearwardly inclined ribs extending below the lower edges and acting as skids 13. Also, the hoods may be equipped with a plurality of sleeves 14ᵃ for passage of the lower ends of the pipes 11. The sleeves may be soldered or otherwise secured to the pipe.

To the outer ends of the axles of the supporting wheels 7, are secured the rear ends of a pair of forwardly converging draft tongues or handles 15 and these handles or draft tongues are held at the desired elevation and preferably in forwardly and upwardly extending position as shown in Figure 2, by means of brace rods 16 that are adjustable in length as indicated at 17, said brace rods being attached at their rear ends to the U-frame 5 adjacent the upper corners thereof and to the intermediate portions of the handles 15. The handles 15 are connected forwardly of the wheels 7 by means of a transverse shaft 18 by means of which the brace rods 16 are connected to said handles and the latter are braced. The shaft 18 also has a plurality of depending knocker rods 19 hinged thereon for vertical swinging movement in a direction parallel with the direction of travel of the device, and these knocker rods are extended to a point whereby the same may engage the standing plants of a row and to preferably knock the insects therefrom upon forward travel of the device.

To catch the insects when they are knocked off of the plant or such of the same as might try to escape whereby the same will be effectively confined in the path of the burners 12, a hood is provided including depending side members 20 carried by the handles 15, and a top member 21 extending across the space between and connecting said handles 15 above the depending hood members 20. The members of this hood may consist of curtain material, and the members 20 preferably extend to a point in close proximity to the ground as shown in Figure 2.

Obviously, the draft tongues or handles 15 may be so constructed or formed as to adapt the implement to be drawn over the ground either by hand, horse or motive power. Also, by supporting the fuel tank upon the shaft 9 for free rotation and rigidly fastening the fuel supply pipe 11 to said tank, the burner and parts carried thereby may yield vertically over irregularities of the ground.

By shortening the brace rods 16, the U-frame 5 can be tilted forwardly for shortening the distance between the rear end of the knocker or catcher hood and the burner.

In operation, the burners 12 are lighted by properly manipulating the valves V carried by the pipes 11, thereby causing an intense flame to be directed over the ground beneath each of the hoods 14, each flame being composed of a plurality of jets issuing from each set of burners. The implement is then drawn toward the right of Figures 1 and 2, so that the row of plants will pass between the sets of burners after having the insects removed or knocked therefrom by the knocker rods 19. When this takes place, the insects are effectively destroyed together with any weeds or grass in the path of the burner, and the hood for the knocker 19 effectively confines the insects to the path of the burner so that all of the same will be destroyed. The hinged knocker rods 19 will obviously oscillate, as they successively engage the standing plants and move past the same.

From the above description, it is believed that the construction and operation, as well as the advantages of the present invention will be readily understood and appreciated by those skilled in the art.

Minor changes may be made without departing from the spirit and scope of the invention as claimed.

What I claim as new is:

1. In a boll weevil exterminator of the character described, an inverted substantially U-shaped frame having outturned end members forming co-axial axles, supporting wheels journalled upon said axles, a pair of handles having their rear ends secured upon the outer ends of said axles, brace rods connecting the upper intermediate portion of the frame with each of said handles, supply tanks supported by and arranged in the upper corners of said frame, fuel supply pipes rigid with and depending rearwardly from each of said tanks and equipped with burners upon the lower ends thereof, normally arranged in close proximity to the ground, means supported by said handles forwardly of the tanks and burners for removing insects from standing plants upon forward travel of the device, the braces between the frame and the handles being adjustable for tilting the frame and varying the distance between the burners and the insect removing means.

2. In a boll weevil exterminator of the character described, an inverted substantially U-shaped frame having outturned end members forming co-axial axles, supporting wheels journalled upon said axles, a pair of handles having their rear ends secured upon the outer ends of said axles, brace rods connecting the upper intermediate portion of the frame with each of said handles, supply tanks supported by and arranged in the upper corners of said frame, fuel supply pipes rigid with and depending rearwardly from each of said tanks and equipped with burners upon the lower ends thereof normally arranged in close proximity to the ground, means supported by said handles forwardly of the tanks and burners for removing insects from standing plants upon forward travel of the device, and a hood carried by the handles in surrounding relation to the insect removing means for confining the insects to the path of the burners upon travel of the device.

In testimony whereof I affix my signature.

JEROME J. B. DREESEN.